Patented Dec. 13, 1949

2,491,411

UNITED STATES PATENT OFFICE 2,491,411

REFRACTORY AGGLOMERATE AND
METHOD OF MAKING

René Lecuir, Paris, France, assignor to Societe
Française Radio Electrique, a corporation of
France No Drawing. Application November 27, 1945, Serial No. 631,225. In France April 24, 1942

2 Claims. (Cl. 106—55)

This invention relates to a process for giving good agglomerating properties to refractory powders.

The grains of these powders retain at their surface, by molecular attraction, certain so-called "adsorbed" gases which adhere so strongly that they cannot be driven out by the agglomerating pressure and consequently hinder good agglomeration. Therefore, in order to obtain agglomerative refractory powders, it is necessary to eliminate the adsorbed gases.

A known process for carrying out this elimination consists in mixing water with refractory powder; water, thanks to its moistening power, takes the place of the adsorbed gases and the refractory powder becomes "agglomerative." The agglomeration of the powder so treated, however, is made under pressure in a mould, and it has been found that products so obtained do not present, after treatment, the homogeneity required.

The process according to the invention permits of obtaining a refractory powder that easily agglomerates and yields, after the agglomerating treatment under pressure, a homogeneous product.

This process consists in mixing with the refractory powder a solid substance fusible at a temperature inferior to that of fusion of the refractory powder, and heating the mixture so constituted until liquefaction of the said solid substance, in order to eliminate the gases adsorbed by the refractory powder.

With a view to describing in detail the process according to the invention, it will be practical first to consider a particular case, that of magnesia powder exhaustively calcined. To make it capable of agglomeration, it will first be thoroughly mixed with, for instance, 15% of urea (urea being a solid substance that melts at 132.6° centigrade). Then the mixture will be heated until the urea melts, and the liquid urea will take the place of the gases adsorbed by the grains of magnesia powder. After cooling, the pulverulent mixture obtained will easily agglomerate, owing to the absence of adsorbed gases; consequently then, the magnesia grains can draw closer under the action of the agglomerating pressure, no residual gases being compressed between the grains.

In a more general manner, to give binding properties to a refractory powder, a solid substance will be used, that melts at a temperature inferior to that of fusion of the refractory powder; but, in practice, it is of advantage to use a substance melting at a low temperature inferior to 300° centigrade for instance. The principal object of the process is to produce a liquid which, thanks to its moistening power, will take the place of the adsorbed gases. It is conceivable that various substances may bring about this result; it must be understood, however, that the selected substance, to be suitable, must be solid when admixed to the refractory powder.

The quantity of additional substance to mix with the refractory powder varies with the nature of this powder and with the considered substance. The suitable quantitative composition of the mixture will be determined experimentally; methodical tests will actually show when the powder obtained after treatment has acquired agglomerating properties.

Among possible additional substances, urea is particularly recommended, because it can be finely divided; this property permits of easily obtaining a perfectly regular mixing (for example in a ball mill) of a definite quantity of refractory powder with the necessary quantity of urea. Other bodies fulfilling the above said conditions are also suitable and among these colophony and oxalic acid are to be mentioned.

As a modification of the above-described process, it is possible and advantageous to carry out simultaneously, in a mixing machine working at a definite temperature, the mixing of the refractory powder with the fusible solid substance, and the heating of the mixture.

What I claim is:

1. A process for improving the agglomerating characteristics of refractory powders of the calcined type which comprises mixing therewith in the solid state about 15% solid urea, heating said mixture and melting said urea whereby the liquid urea replaces the absorbed gases in the solid refractory powder, and cooling said treated mixture to cause agglomeration thereof.

2. A calcined refractory agglomerate comprising about 15% urea and the remainder a calcined refractory material, said agglomerate being characterized by the deposits of urea in the interstices of the refractory material whereby to obtain an improved agglomerative effect.

RENÉ LECUIR.

REFERENCES CITED

The following references are of record in the file of this patent:

UNITED STATES PATENTS

| Number | Name | Date |
| --- | --- | --- |
| 1,057,667 | Pine et al. | Apr. 1, 1913 |
| 1,901,325 | Novatny | Mar. 14, 1933 |
| 2,103,249 | Eells | Dec. 28, 1937 |
| 2,120,549 | Dike | June 14, 1938 |
| 2,308,115 | Schwartzwalder et al. | Jan. 12, 1943 |
| 2,314,107 | Shardlow | Mar. 16, 1943 |
| 2,328,290 | Neiderreither et al. | Aug. 31, 1943 |
| 2,332,220 | Harshberger | Oct. 19, 1943 |
| 2,336,182 | McDougal et al. | Dec. 7, 1943 |